(12) United States Patent
Berke

(10) Patent No.: US 11,886,291 B1
(45) Date of Patent: Jan. 30, 2024

(54) PROVIDING CACHE LINE METADATA OVER MULTIPLE CACHE LINES

(71) Applicant: DELL PRODUCTS L.P., Round Rock, TX (US)

(72) Inventor: Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/869,963

(22) Filed: Jul. 21, 2022

(51) Int. Cl.
*G06F 11/10* (2006.01)
*G06F 12/0893* (2016.01)

(52) U.S. Cl.
CPC ...... *G06F 11/1064* (2013.01); *G06F 12/0893* (2013.01); *G06F 2212/1032* (2013.01)

(58) Field of Classification Search
CPC ............. G06F 11/1064; G06F 12/0893; G06F 2212/1032
USPC .......................... 714/768, 769, 773, 774, 799
See application file for complete search history.

(56) References Cited

U.S. PATENT DOCUMENTS

| | | | |
|---|---|---|---|
| 9,645,932 B1 | 5/2017 | Bono et al. | |
| 10,282,294 B2 * | 5/2019 | Chang | G06F 12/0895 |
| 11,487,616 B2 * | 11/2022 | Chachad | G06F 9/3816 |
| 11,693,754 B2 * | 7/2023 | Durham | G06F 11/1048 714/30 |
| 2004/0015660 A1 * | 1/2004 | Benveniste | G06F 12/0864 711/134 |
| 2015/0006848 A1 * | 1/2015 | Hinton | G06F 9/30109 712/27 |
| 2020/0371918 A1 * | 11/2020 | Chachad | G06F 12/126 |
| 2021/0390024 A1 * | 12/2021 | Durham | G06F 21/79 |
| 2023/0055293 A1 * | 2/2023 | Song | G06F 11/1064 |

* cited by examiner

*Primary Examiner* — John J Tabone, Jr.
(74) *Attorney, Agent, or Firm* — Larson Newman, LLP

(57) ABSTRACT

An information handling system utilizes data with a cache line size. A memory module is coupled to a memory controller by a memory bus, and stores and retrieves data with a memory line size. The cache line size is an integer multiple of the memory line size. The memory controller calculates error correction code data for each memory line of user data, and generates metadata related to the user data for chunks of data that are equal to an integer number (N) of cache lines, where N is greater than one.

20 Claims, 3 Drawing Sheets

200

Bursted Cache Line Write

210

Multi-Cache Line Write

PROVIDING CACHE LINE METADATA OVER MULTIPLE CACHE LINES

FIELD OF THE DISCLOSURE

This disclosure generally relates to information handling systems, and more particularly relates to providing cache line metadata over multiple cache lines in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may utilize data with a cache line size. A memory module may store and retrieve data with a memory line size. The cache line size may be an integer multiple of the memory line size. A memory controller may calculate error correction code data for each memory line of user data, and may generate metadata related to the user data for chunks of data that are equal to an integer number (N) of cache lines, where N is greater than one.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1A:
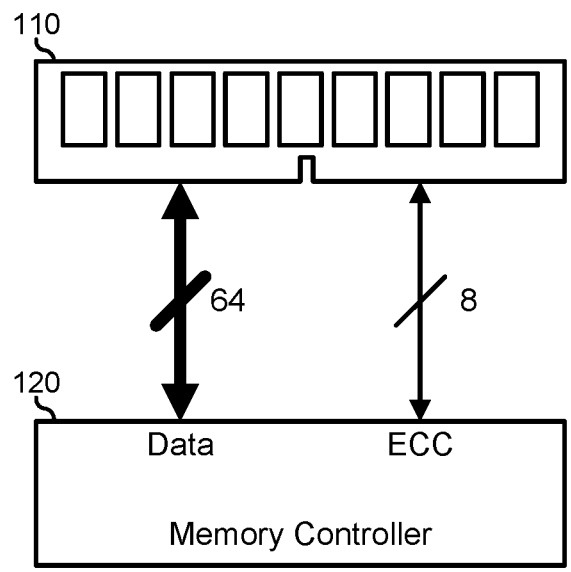
FIGS. 1A and 1B are block diagrams of information handling systems according to the prior art.

FIG. 1A illustrates an information handling system 100 according to the prior art. Information handling system 100 includes a memory module 110, and a memory controller 120. Information handling system 100 may be understood to be similar to information handling systems 100, described above, or information handling system 500, described below, and will be understood to include additional components as needed or desired. Memory module 110 represents a memory storage device, such as a double data rate (DDR) dual in-line memory module (DIMM), a small outline DIMM (SO-DIMM), a compression attached memory module (CAMM), or the like, and may represent one or more additional memory modules, as needed or desired.

Memory controller 120 is connected to memory module 110 by a data bus that includes 64-bits of user data and 8-bits of error correction code (ECC) data. The ECC data provides an error checking and correcting function. Memory controller 120 operates to receive the 64-bit user data and to generate the 8-bit ECC data. The 64-bit user data and the 8-bit ECC data are then written to memory module 110. Upon reading the data, memory module 110 sends the 64-bit user data and the 8-bit ECC data to memory controller 120. Memory controller 120 then processes the received 64-bit user data and the 8-bit ECC to identify and correct bit errors A typical ECC scheme utilizing 64-bit user data and 8-bit ECC data will enable the correction of single-bit errors, and the detection of double-bit errors. More powerful ECC schemes utilizing 64-bit user data and 8-bit ECC data will enable correction of an entire ×4 DRAM failure ("chip kill"), as needed or desired. If memory controller 120 detects a correctable error in the user data, the memory controller corrects the data and processing proceeds as intended. On the other hand, if memory controller 120 detects an uncorrectable error in the user data, the memory controller issues an indication of a fault and information handling system 100 invokes an exception handler to deal with the fault. The details of error detection and correction, ECC generation, fault handling, and the like are known in the art and will not be further described herein, except as needed to illustrate the current embodiments.

Figure 1B:
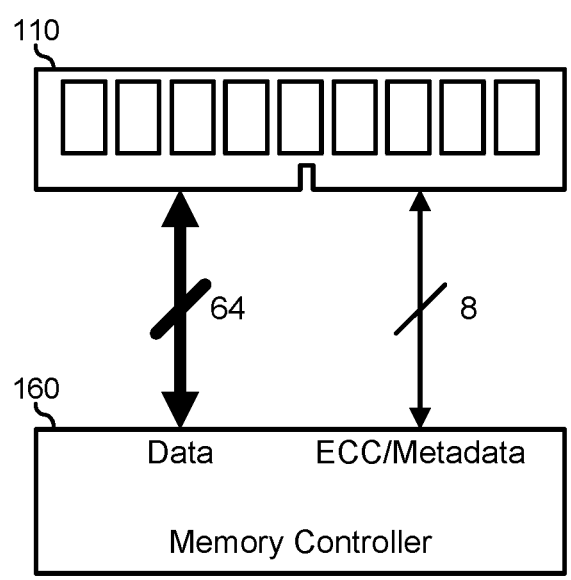

FIG. 1B illustrates an information handling system 150 according to the prior art. Information handling system 150 includes a memory module 110, as described above, and a memory controller 160. Information handling system 150 may be understood to be similar to information handling systems 100. Memory controller 160 is connected to memory module 110 by a data bus that includes 64-bits of user data and 8-bits of ECC data or controller generated metadata. Various processor manufacturers include functions and features within the memory controllers of their processors that generate, manage, and manipulate certain proprietary metadata associated with the stored user data. An example of manufacturer specific metadata may include a directory status associated with the cache line, a memory encryption hash, a security key hash, a caching tag, or the like.

The metadata may consist of one or more bits of information that is stored on memory module 110 in the 8-bit data field associated with the ECC data. In other words, the inclusion of one or more metadata bits necessarily decreases the number of ECC data bits stored in association with the user data. As such, the inclusion of metadata results in a decrease in the robustness of the ECC function as described above. For example, by utilizing less than 8-bits of the ECC data for the actual error detection and correction function, memory controller 160 may only be able to correct single-bit errors but not to detect double-bit errors, the memory controller may only be able to detect single- or double-bit errors, but be unable to correct any errors, or the memory controller may be otherwise degraded in its ability to correct or detect bit errors in the received user data. Memory controller 160 may include setting options that enable the use of all 8-bits for error detection and correction purposes. However, the use of such setting options then compromises the ability to attain the benefits of the use of the metadata, leaving the end user of information handling system 150 to choose between full-scope error detection and correction without the benefits of the metadata, or a compromised error detection and correction functionality with the benefits of the metadata.

In the cases described above with regard to FIGS. 1A and 1B, it will be understood that a processor will typical include one or more levels of cache memory in order to improve the performance of the information handling system. The cache memory is typically arranged in cache lines that consist of a number of bytes that is greater than the data bus width of the memory bus between a memory controller and the memory modules connected to the memory controller. For example, a typical processor may utilize cache lines that are 64-bytes wide. On the other hand, for DDR4 and prior generations, the data bus is 64-bits (or 8-bytes) wide, or, for DDR5, the data bus is 32-bits (or 4-bytes) wide. As such, when a processor performs a cache line read or a cache line write, the associated memory controller will perform a bursted read or a bursted write that corresponds with the cache line width. For example, where the data bus is 64-bits (8-bytes) wide, a cache line read will be executed by the memory controller as a bursted read of eight (8) successive read transactions on the memory bus, or, where the data bus is 32-bits (4-bytes) wide, a cache line read will be executed by the memory controller as a bursted read of 16 successive read transactions on the memory bus. For this reason, memory controllers and memory modules are typically optimized to provide the highest level of performance when burst lengths correspond with the cache line size of the associated processor.

Particularly in the case of information handling system 150, as described above, the ECC data may be understood to be calculated for each memory line (8 bytes) or across multiple memory lines where "chip-kill" is supported (for example 16 or 32 bytes). On the other hand, the metadata is typically calculated on a per-cache-line basis. An exemplary case is provided in the top portion of FIG. 2, where a cache line 200 of data is illustrated as eight memory lines. Each memory line may include six (6) bits of ECC data, and two (2) bits of metadata. However, in this basic ECC scheme, the ECC data for each memory line is only associated with that user data in that particular memory line, or, where "chip-kill" is supported, with the user data in, e.g., two (2) or four (4) memory lines. On the other hand, the memory controller is configured to evaluate each cache line, and to ascribe the generated metadata to the entire cache line. As such, the 16 bits of metadata (2-bits per memory line times 8 memory lines) relate to the entire cache line. In this way, richer metadata features may be encoded across the cache line than could be encoded across just a memory line. For example, if the 2-bits of metadata were only associated with the particular memory line, only four (4) metadata states could be encoded per memory line. On the other hand, by generating metadata per cache line, a richer body of metadata features may be encoded.

It has been understood by the inventor of the current disclosure that, even with the generation of metadata per cache line of data, the needs and demands for metadata associated with storage data in enterprise environments is rapidly increasing beyond the ability of per-cache-line metadata to suffice. In particular, future generations of DDR memory standards may contemplate the addition of dedicated metadate lines to the data bus between a memory controller and the connected memory module, not only to free up the ECC lines for ECC purposes, but also to provide a scalable way to permit the further increase in the quantity of metadata associated with data storage.

Figure 2:
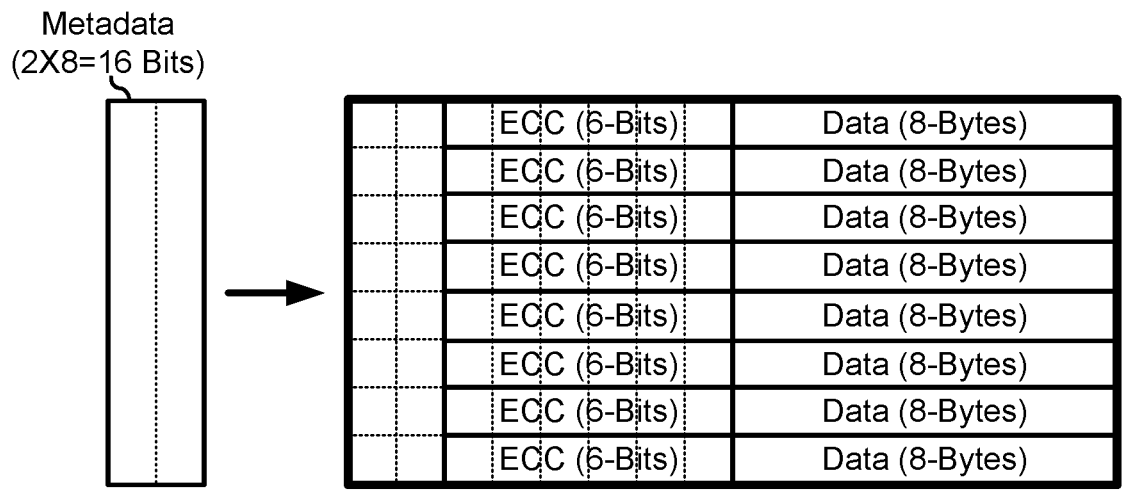
FIG. 2 illustrates metadata generation across various chunks of data according to an embodiment of the current disclosure.
Figure 2:
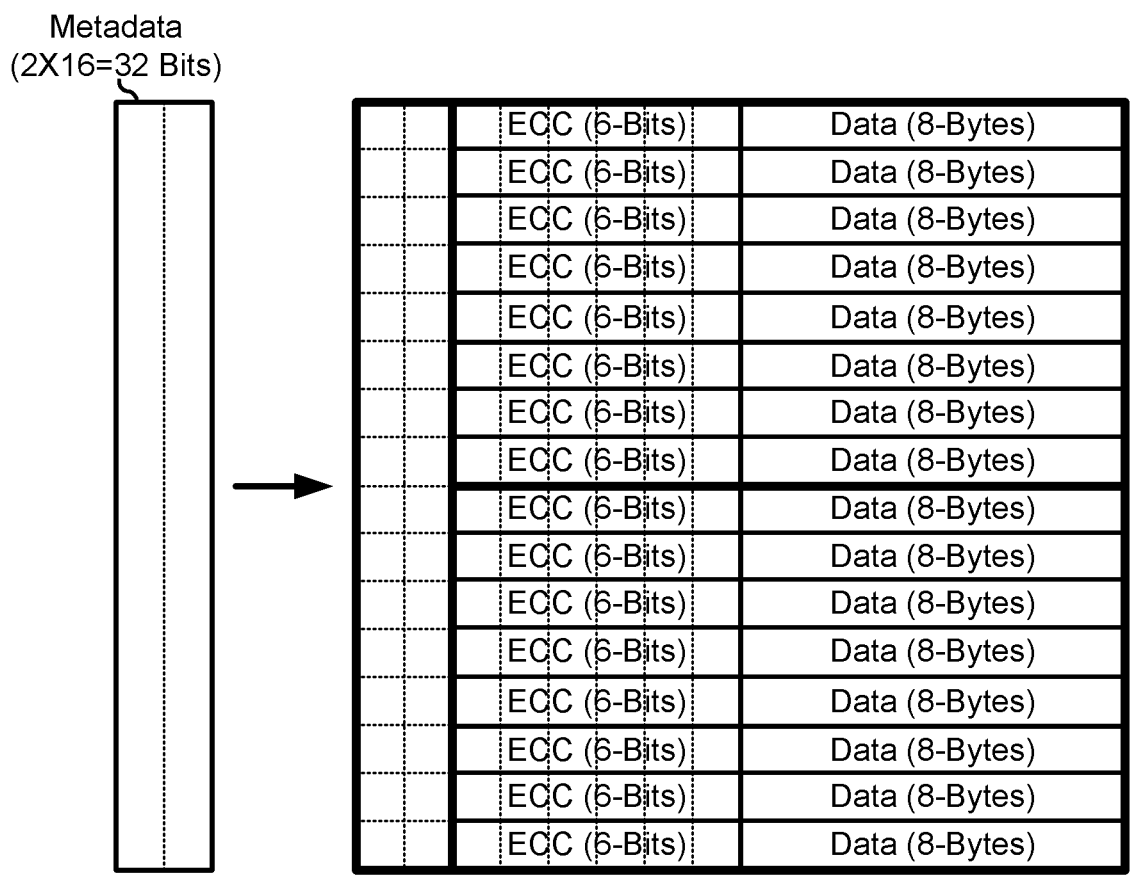

The bottom portion of FIG. 2 illustrates a block 210 of cache lines. Cache line block 210 includes two cache lines, where each cache line of data is illustrated as eight memory lines, and thus the cache line block is illustrated as 16 memory lines. Each memory line may include six (6) bits of ECC data, where the ECC data for each memory line is only associated with the user data in that particular memory line. Each memory line may further include two (2) bits of metadata. In this embodiment, the memory controller is configured to evaluate cache line block 210, and to ascribe the generated metadata to the entire cache line block. That is, the metadata is calculated on a multi-cache line basis. As such, the 32 bits (four (4) bytes) of metadata (2-bits per memory line times 16 memory lines) relate to the entirety of cache line block 210. In this way, even richer metadata features may be encoded across the cache line block than could be encoded across just a cache line. For example, if the 2-bits of metadata were only associated with the particular cache line, only $2^{16}$ (64 K) metadata states could be encoded per memory line. On the other hand, by generating metadata per cache line block, where the cache line block includes two (2) cache lines, a richer body of metadata features may be encoded with $2^{32}$ (4 M) metadata states.

While cache line block 210 is illustrated as including two (2) cache lines, this is not necessarily so, and a memory controller may be configured to calculate metadata across a cache line block that includes more than two (2) cache lines (such as four (4) cache lines to provide 64 bits (8 bytes) of metadata, eight (8) cache lines to provide 128 bits (16 bytes) of metadata, 16 cache lines to provide 256 bits (32 bytes) of metadata, etc.). In such cases, even greater flexibility for the use of metadata associated with the user data stored in the cache line block may be obtained.

Where not all cache lines of cache line block 210 are modified cache lines, the changes to the user data of the modified cache lines will likely result in changes to the metadata associated with the cache line block. As such, the memory controller, when performing a write-back of a particular cache line within cache line block 200, will operate to perform read-modify-write operations on all of the cache lines within the cache line block, in order to recalculate the metadata for the cache line block and save the modified user data and the modified metadata with of the cache line block. For example, the memory controller may include a buffer region large enough to store all of the cache lines of a cache line block. Then, when the memory controller performs a write-back of a cache line, the memory controller will operate to retrieve all of the other cache lines associated with the cache line block that includes the modified cache line. Then, operating on the entire cache line block, the memory controller can generate the new metadata for the cache line block, and then save the cache line block back to memory.

In a particular embodiment, the various cache lines within a cache line block are composed of successive memory lines within the system physical address space of the information handling system. For example, where a cache line block includes four (4) cache lines, and the cache line address of the first cache line is N, then the following cache lines will have respective addresses N+1, N+2, and N+3. In this way, for the purposes of metadata generation, the system physical address space can be divided into four-cache-line-block chunks, and the metadata boundaries will always be known to be bound within the four-cache-line-block chunks. Further, where a cache line write-back with a particular address is performed, the other cache lines to be modified will be known based upon the address of the cache line to be written back. For example, if the address of a cache line to be written is N+2, then the memory controller will understand that, for the purposes of generating the metadate for the cache line block, the memory controller will need to fetch the cache lines at N, N+1, and N+3 to generate the metadata for the cache line block.

In establishing the multi-cache line basis for generating metadata, an information handling system may need to be programmed to implement a common cache line block size. As such, the memory controller and the memory of the information handling system may need to be configured during a boot process of the information handling system. For example, a basic input/output system (BIOS)/universal extensible firmware interface (UEFI) of the information handling system can program a particular control status register (CSR) to denote the number of cache lines in a cache line block. Further, when applying metadata across multiple cache lines, other elements of the information handling system, in addition to the BIOS, may need to be aware of the multi-cache line granularity of the metadata. For example, an operating system (OS), applications, or other elements of the information handling system may need to be aware of the granularity of the metadata coverage because the granularity may impact hardware caching policies, memory encryption chunk size, security access chunk size, or other cases where the metadata covers more than one (1) cache line.

In a particular embodiment, the sacrificial use of ECC lines for the purposes of storing metadata is forestalled by the inclusion on the memory module of dedicated metadata lines that are connected to one or more additional memory device in parallel with the data and ECC devices, as needed or desired. Here, the information handling system retains the benefits of full ECC coverage for the user data, but also provides for a more scalable and dedicated use of the metadata. However, even here, the determination of the metadata across multiple cache lines will still provide for more flexible use and increased feature set for the metadata, as needed or desired.

Figure 3:
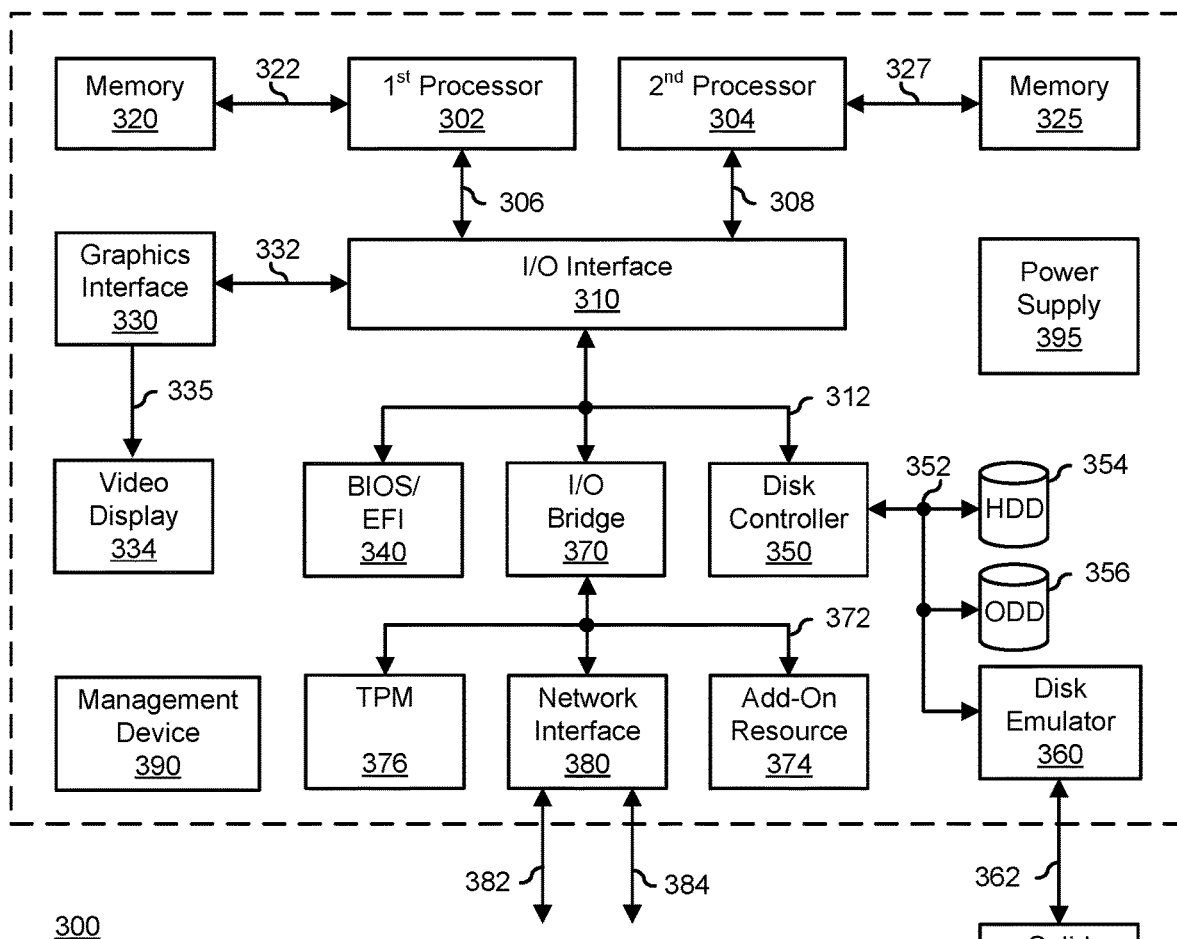
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI- Extended (PCI-x) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
   a processor configured to utilize data with a cache line size, the processor including a memory controller; and
   a memory module coupled to the memory controller by a memory bus, wherein the memory module is config- ured to store and retrieve data with a memory line size, wherein the cache line size is an integer multiple (A) of the memory line size;

wherein the memory controller is configured to calculate error correction code (ECC) data for an integer number (B) of memory lines of user data, and to generate metadata related to the user data for chunks of data that are equal to an integer number (C) of cache lines, where B<A*C and C is greater than one.

2. The information handling system of claim 1, wherein the memory controller is further configured to receive first user data from the processor, the first user data including a first cache line associated with a first location in a physical address space of the information handling system, and to retrieve second user data including a second cache line associated with a second location in the physical address space in response to receiving the first user data, the second location being adjacent to the first location in the physical address space.

3. The information handling system of claim 2, wherein, when the integer number (C) of cache lines is equal to two (C=2), the memory controller is further configured to generate first metadata for the first user data and the second user data.

4. The information handling system of claim 3, wherein the memory controller is further configured to store the first user data to the memory module with a first portion of the first metadata, and to store the second user data to the memory module with a second portion of the first metadata.

5. The information handling system of claim 1, wherein the memory bus includes a first number (X) of user data lanes and a second number (Y) of auxiliary data lanes, and wherein the memory controller utilizes the (Y) auxiliary data lanes as a third number (M) of ECC lanes and a fourth number (N) of metadata lanes, where Y=M+N.

6. The information handling system of claim 5, wherein the memory module is a fourth generation double data rate (DDR4) memory module with X=64 data lanes, and with Y=8 auxiliary data lanes.

7. The information handling system of claim 6, wherein the memory controller utilizes the (Y=8) auxiliary lanes as six (M=6) ECC lanes and two (N=2) metadata lanes, and wherein a cache line size is equal to eight (8) bytes.

8. The information handling system of claim 6, wherein, when the integer number (C) of cache lines is equal to two (C=2), the memory controller generates 32 bits of metadata for each chunk of user data.

9. The information handling system of claim 5, wherein the memory module is a fifth generation double data rate (DDR5) memory module with X=32 data lanes, and with Y=8 auxiliary data lanes.

10. The information handling system of claim 1, wherein the metadata includes at least one of directory status associated with the memory write data, a memory encryption hash, a security key hash, and a caching tag.

11. A method, comprising:
coupling, by a memory bus, a memory module of an information handling system to a memory controller of a processor of the information handling system, wherein the processor is configured to utilize data with a cache line size, wherein the memory module is configured to store and retrieve data with a memory line size, and wherein the cache line size is an integer multiple (A) of the memory line size;

calculating, by the memory controller, error correction code (ECC) data for an integer number (B) of memory lines of user data; and generating, by the memory controller, metadata related to the user data for chunks of data that are equal to an integer number (C) of cache lines, where B<A*C and C is greater than one.

12. The method of claim 11, further comprising:
receiving, by the memory controller, first user data from the processor, the first user data including a first cache line associated with a first location in a physical address space of the information handling system; and retrieving second user data including a second cache line associated with a second location in the physical address space in response to receiving the first user data, the second location being adjacent to the first location in the physical address space.

13. The method of claim 12, wherein, when the integer number (C) of cache lines is equal to two (C=2), the method further comprises generating first metadata for the first user data and the second user data.

14. The method of claim 13, further comprising:
storing, by the memory controller, the first user data to the memory module with a first portion of the first metadata; and storing, by the memory controller, the second user data to the memory module with a second portion of the first metadata.

15. The method of claim 11, wherein the memory bus includes a first number (X) of user data lanes and a second number (Y) of auxiliary data lanes, and wherein the memory controller utilizes the (Y) auxiliary data lanes as a third number (M) of ECC lanes and a fourth number (N) of metadata lanes, where Y=M+N.

16. The method of claim 15, wherein the memory module is a fourth generation double data rate (DDR4) memory module with X=64 data lanes, and with Y=8 auxiliary data lanes.

17. The method of claim 16, wherein the memory controller utilizes the (Y=8) auxiliary lanes as six (M=6) ECC lanes and two (N=2) metadata lanes, and wherein a cache line size is equal to eight (8) bytes.

18. The method of claim 16, wherein, when the integer number (C) of cache lines is equal to two (C=2), the memory controller generates 32 bits of metadata for each chunk of user data.

19. The method of claim 11, wherein the metadata includes at least one of a flag of a number of uncorrectable errors that have been written to the memory module, a directory status associated with the memory write data, a memory encryption hash, a security key hash, and a caching tag.

20. An information handling system, comprising:
a processor configured to utilize data with a 64-byte cache line size, the processor including a memory controller; and a memory module coupled to the memory controller by a memory bus, wherein the memory module is configured to store and retrieve data with an 8-byte memory line size;

wherein the memory controller is configured to calculate six (6) bits of error correction code data for each memory line of user data, and to generate 32-bits of metadata related to the user data for chunks of data that are equal to an two (2) cache lines.

* * * * *